D. E. ROSS.
WORM DRIVE AND COMPENSATING GEARING.
APPLICATION FILED DEC. 16, 1908.

999,876.

Patented Aug. 8, 1911.

Witnesses:

Inventor
David E. Ross
By Bates, Fouts & Hull
Attys

UNITED STATES PATENT OFFICE.

DAVID E. ROSS, OF BROOKSTON, INDIANA, ASSIGNOR TO THE ROSS GEAR & TOOL COMPANY, OF LA FAYETTE, INDIANA, A CORPORATION OF INDIANA.

WORM-DRIVE AND COMPENSATING GEARING.

999,876.                 Specification of Letters Patent.         Patented Aug. 8, 1911.

Application filed December 16, 1908. Serial No. 467,776.

*To all whom it may concern:*

Be it known that I, DAVID E. ROSS, a citizen of the United States, residing at Brookston, in the county of White and State of Indiana, have invented a certain new and useful Improvement in Worm-Drives and Compensating Gearing, of which the following is a full, clear, and exact description, reference being had to the accompanying drawings.

This invention relates generally to devices for driving shaft or axle sections, and it has particular reference to a worm-gear for driving said sections and to the compensating gearing through which said sections may be driven at different rates of speed.

The object of the invention is to provide a device of the character stated which shall be simple and economical in construction and efficient in operation.

The more specific features of my invention will appear from the following specification taken in connection with the accompanying drawings, in which—

Figure 1:
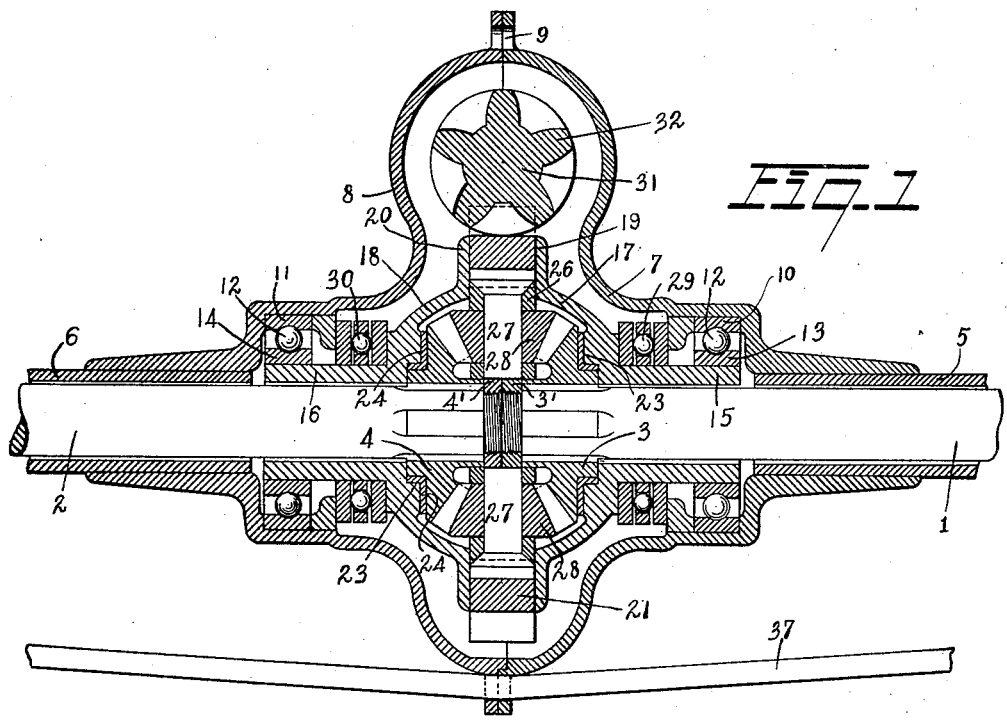
Figure 2:
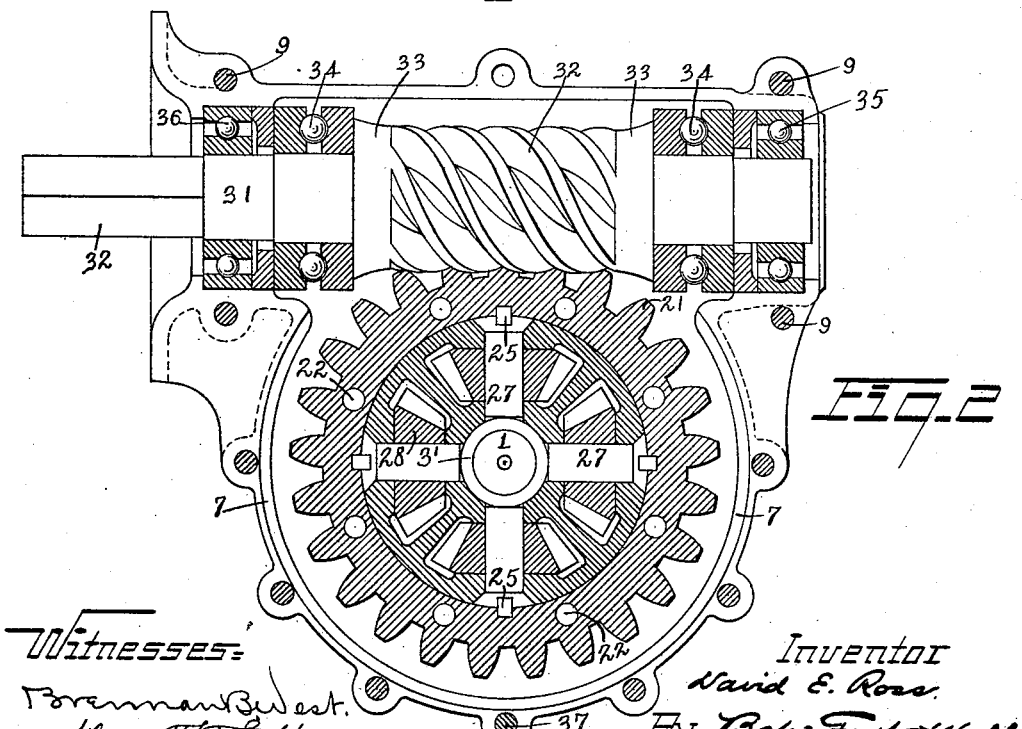

Figure 1 is a sectional view taken in the plane of the axle sections; and Fig. 2 is a sectional view taken centrally through Fig. 1 at right angles to the axle sections.

Taking up a detailed description of my invention by the use of reference characters, 1 and 2 represent the adjacent ends of the axle or shaft sections, the construction illustrated being specially adapted for use in automobiles in which case the said sections would represent the inner portions of the rear axle sections of the automobile. The inner ends of the axle sections are made irregular or non-cylindrical in cross section so as to provide a driving engagement with the bevel gears 3 and 4 which are mounted upon the ends of the axle sections 1 and 2 respectively. These irregular portions of the axles may be formed in any practical way, or the gears may be keyed to the sections, as is common in such constructions, the gears being held in place by nuts 3′ and 4′ which screw on their respective axle sections. Surrounding the axle sections 1 and 2 are the tubular housings 5 and 6, which extend outwardly from the main gear casing toward the ground wheels for the rear axle sections. Surrounding the inner ends of the said tubular housings are the sections 7 and 8 of the main gear casing, the said casing being divided on a vertical plane through the center, the driving gears and their various bearings, hereinafter described, being contained within said casing. The sections of the casing are secured together in any suitable manner, as by bolts passing through openings 9 in the outer adjacent edges of said sections.

Within the casing sections adjacent the respective ends of the tubular housings 5 and 6 are roller-bearing rings 10 and 11, in raceways in which rotate the balls 12 of said bearing. Within the rings 10 and 11, and having the coöperating race-ways for the balls, are rings 13 and 14, the same being mounted upon the outer tubular ends 15 and 16 respectively of gear housings 17 and 18, the extensions 15 and 16 being in axial alinement with the tubular housings 5 and 6 and being bored with an internal diameter substantially the same as that of said tubular housings. At the inner ends of said extensions 15 and 16, the housings 17 and 18 flare outwardly so as to form, when assembled, an approximately spherical shell, each of said housing sections being provided with an annular flange at 19 and 20 respectively, by means of which the said sections may be secured to a worm-wheel 21, the housing sections being secured to said wheel in any suitable manner, as by screws or bolts passing through the flanges and through openings 22 in the said wheel. Within the flared portions of the respective housing sections, I provide annular shoulders 23 which are adapted to project over the hubs of the respective gears 3 and 4, the housing sections thus being journaled upon the hubs of said gears and being separated therefrom by bushings 24 so as to prevent excessive wear. These housing sections are therefore journaled within the casing sections 7 and 8 and upon the hubs of the said gears.

Secured to the worm gear 21 by means of keys 25, is a spider 26, said spider carrying a series of journal-pins 27 for planetary pinions 28, there being one of these pinions journaled upon each of said pins, said pinions meshing with each of the gears 3 and 4. The spider 26 is circular on its outer periphery to conform to the circumference of the worm gear, and its inner portion is also substantially circular to fit about inwardly extending flanges on the gears 3 and 4. Between the planetary pinions, the spider is provided with inwardly extending arms or spokes which materially strengthen the construction of the spider. In order to prevent the journal pins 27 from rotation, and to apply the driving power directly to the pins, the heads of the pins are slotted so as to form a way for the keys 25, the spider frame being thus secured to the worm gear by the keys which extend through the heads of the journal pins.

To take up the end thrust of the housing sections, ball bearings are employed at each end of the housing, the same being shown at 29 and 30.

In its upper part, the main casing sections 7 and 8 are so constructed as to form a tubular housing for the drive shaft 31, said shaft being preferably squared at its end 32 for convenient attachment to the main driving mechanism of the device. Near its center, the shaft section is provided with a driving worm 32 which meshes with teeth on the worm gear 21, whereby the latter is driven and, through the connections hereinbefore described, motion is imparted to the axle sections. As will be understood, the pitch of the threads on the worm should be such as to rotate the worm wheel at the desired speed with the least amount of friction possible when the worm is driven, and yet the pitch should also be such as to make it possible to push the automobile about when desired without running the engine or for permitting the same to coast when going down an incline. In the construction of the worm, I have found that an angle of 25 degrees of the helix formed by the threads on the worm is practical, and at present I prefer to use substantially this angle. The shaft section 31 and the worm 32 thereon are preferably integral in construction, and at the end of the worm the said section is preferably provided with annular extensions or flanges 33 against which thrust bearings 34 may operate. The journal bearings for the shaft sections are shown at 35 and 36.

The sections of the casing 7 and 8 may be supported within the machine in any desired manner, and, for strengthening the construction, a truss rod 37 may be employed, the same preferably passing through one of the perforations 9 in the lower part of the casing sections.

Having thus described my invention, what I claim is:

1. In gearing, the combination with a pair of alined shaft or axle sections, of bevel gears secured to the adjacent ends of said sections, a worm gear mounted co-axially with respect to the said sections, a spider within the said worm gear, one or more journal pins mounted radially in said spider, said pins being provided with slots in their outer ends, keys connecting the spider and the worm gear and passing through the slots in the ends of said journal pins, a planetary pinion mounted on each of said pins and meshing with each of the said gears, and a worm meshing with and driving the worm gear.

2. In gearing, the combination with a pair of axle or shaft sections, of bevel pinions secured to the adjacent ends of the respective sections, a driving member mounted co-axially with respect to the said sections, means for driving said member, a spider within the said member, one or more journal pins mounted radially in the said spider, each of said pins being provided with a key slot in its outer end, keys passing through said slots and through corresponding slots in the said member whereby the spider, the pins and the member are secured together, and a planetary gear journaled on each of said pins and meshing with the gear on each of the said sections.

3. In gearing, the combination with a pair of alined shaft or axle sections, of a gear for and secured to the inner end of each of said sections, a worm wheel mounted co-axially with respect to the said sections, a spider frame within the said worm wheel, one or more journal pins extending radially in the said spider frame, each of said pins being provided with a key slot in its outer end, a key for each of said pins, said keys lying in the slots in the pins and extending into corresponding slots in the worm wheel, a planetary pinion journaled on each of said pins and meshing with the gears on the said sections, a pair of housing sections inclosing the said gears and pinions and turning with the spider, said housing sections each being journaled on the hubs of the said gears, a gear casing surrounding the said shaft or axle sections and inclosing the worm wheel and the housing sections, a worm journaled in the said gear casing and meshing with the worm wheel for driving the latter, and roller bearings between the gear casing and the housing sections for holding the latter in position.

4. In gearing, the combination with a pair of alined shaft or axle sections, of a bevel gear for and secured to the inner end of each of said sections, a worm wheel mounted co-axially with respect to the said sections, a spider frame within the said worm wheel, one or more journal pins extending radially in the said spider frame, each of said pins being provided with a key slot in its outer end, a key for each of said pins, said keys lying in the slots in the pins and extending into corresponding slots in the worm wheel, a planetary pinion journaled on each of said pins and meshing with the gears on the said sections, a pair of housing sections secured to the worm wheel and inclosing the said gears and pinions, said housing sections each being journaled on the hubs of the said bevel gears, a gear casing surrounding the said shaft or axle sections and inclosing the worm wheel and the housing sections, a worm journaled in the said gear casing and meshing with the worm wheel for driving the latter, and roller bearings between the gear casing and the housing sections for holding the latter in position.

5. In gearing, the combination with a pair of alined shaft or axle sections, of a bevel gear for and secured to each of the said sections, a worm wheel mounted co-axially with respect to the said sections, a spider frame within the said worm wheel, a plurality of journal pins mounted radially in the said spider frame, the outer ends of said pins terminating adjacent the worm wheel and being provided with transverse key slots at their ends, a key for each of said journal pins extending through the slot in the end of the latter and into the said worm wheel whereby the spider frame, the pins and the worm wheel are secured together, a planetary pinion journaled on each of said pins and meshing with the said gears on the shaft or axle sections, a pair of housing sections secured to the worm wheel and surrounding the said gears, each section of the housing being journaled upon the hub of its respective gear, a pair of gear case sections surrounding the axle sections and the said housing sections, said casing sections being adapted to be secured together, a driving worm journaled in the said casing sections and meshing with the worm wheel, and roller bearings between the casing sections and the housing sections for holding the latter in position within the casing sections.

In testimony whereof, I hereunto affix my signature in the presence of two witnesses.

DAVID E. ROSS.

Witnesses:
WILLIAM ROSS,
EDWARD A. ROSS.

Copies of this patent may be obtained for five cents each, by addressing the "Commissioner of Patents, Washington, D. C."